(12) United States Patent
Bodin

(10) Patent No.: US 6,223,224 B1
(45) Date of Patent: Apr. 24, 2001

(54) METHOD AND APPARATUS FOR MULTIPLE FILE DOWNLOAD VIA SINGLE AGGREGATE FILE SERVING

(75) Inventor: William Kress Bodin, Austin, TX (US)

(73) Assignee: International Business Machines Corporation, NY (US)

( * ) Notice: Subject to any disclaimer, the term of this patent is extended or adjusted under 35 U.S.C. 154(b) by 0 days.

(21) Appl. No.: 09/213,843

(22) Filed: Dec. 17, 1998

(51) Int. Cl.⁷ .................................................... G06F 13/42
(52) U.S. Cl. ............................................. 709/236; 709/203
(58) Field of Search .................................. 709/203, 217, 709/219, 232, 236

(56) References Cited

U.S. PATENT DOCUMENTS

| | | | |
|---|---|---|---|
| 5,175,817 | * 12/1992 | Adams et al. | 709/236 |
| 5,966,702 | * 10/1999 | Fresko et al. | 707/1 |
| 6,002,852 | * 12/1999 | Birdwell et al. | 709/203 |
| 6,014,707 | * 1/2000 | Miller et al. | 709/232 |
| 6,047,318 | * 4/2000 | Becker et al. | 709/217 |
| 6,061,733 | * 5/2000 | Bodin et al. | 709/223 |
| 6,076,109 | * 6/2000 | Kikinis | 709/228 |
| 6,098,102 | * 8/2000 | Nielsen et al. | 709/229 |

* cited by examiner

*Primary Examiner*—Kenneth R. Coulter
(74) *Attorney, Agent, or Firm*—David A. Mims, Jr.

(57) ABSTRACT

A method and apparatus for downloading a selected file from the Internet, where the selected file has either companion files, optional files, documentation or other similarly related files. Selected file plus any related files are dynamically combined on a server and which passes the combined files in a consolidated binary datastream as a single download event to a user's client machine. The binary datastream contains a header which is later decoded via client-side executable. The client-side executable interprets the header of the download files and allows extraction of single file, any subset of the downloaded files or all of the files. Additional descriptors may be embedded into the datastream which allow the client-side executable to display other information relative to the collection of downloaded files.

12 Claims, 7 Drawing Sheets

METHOD AND APPARATUS FOR MULTIPLE FILE DOWNLOAD VIA SINGLE AGGREGATE FILE SERVING

FIELD OF THE INVENTION

The present invention relates to data processing systems, and more particularly, to transferring multiple files in an Internet environment from a server machine to a client machine.

BACKGROUND OF THE INVENTION

Although the Internet has existed for almost twenty-five years, its use has accelerated over the past few years at a previously unanticipated rate. The Internet has become a new communication environment that can be compared to a virtual telephone system with its own, sophisticated, computerized worldwide directory. The Internet has become increasingly popular for business applications such as its use as a mechanism for distributing software and other information. Many millions of users of the Internet have learned firsthand just how frustrating navigating the Internet can be. In order to increase the productivity of users in an Internet environment, by reducing the time wasted waiting for downloading information, a need exists to substantially speed up delivery of information.

The software and other information sought to be downloaded over the Internet frequently exists in multiple files. A selected file may have other files which are either companion files, optional files, documentation, or other related files. In order to select the files which are appropriate to a given user's needs, the user has to initiate several separate download sessions. In each of these sessions, the user must specify which objects/files must be obtained and where the object is to be stored on the client machine. This results in a redundancy of work for the user which interrupts work flow and creates a multiplicity of files on the client's computer with no documentation relative to the contents of the individual files.

One example of these types of files are found in the application development environment where reusable software components may be combined to create new application programs. A front runner has emerged in the reusable software component arena developed by the Sun Microsystems Corporation known as a "bean". A Java bean or bean is a reusable software component that can be visually manipulated by a builder's tool to create new application programs. Beans have been created as simple push buttons, text field list boxes, scrollbars, or dialogs. More complex beans have been created as calendars, spreadsheets or calculators. The idea is that the standard interfaces of the beans allow for interchangeable, reusable components that can be created and sold by vendors in a manner similar to parts in a car, which can be replaced by components made by many different competing manufacturers. These reusable software components have found a thriving distribution channel in the form of the Internet. Since the reusable software components frequently exist in multiple separate files, users must initiate several download sessions in order to store the files on a client machine.

One prior art solution attempted to alleviate the problems of downloading multiple files by increasing the speed of the hardware. This effort has been mainly concentrated on increasing the computer's modem speed. Since a 14,400 baud modem will download a file seven times faster then a 2400 baud modem, a file that takes one hour to download at 2400 baud would only take 8.6 minutes at 14,400 baud. Consequently, modem speeds have undergone seemingly endless increases from 2400 baud to 14.4K, 28.8K, 33.6K to today's highest-speed modems, which are capable of transmitting at or below a 56K baud rate. While the increases in modem speed eases the downloading of files in certain instances, what has resulted is a plethora of computers containing modems of differing transfer rates and capabilities.

Still other prior art techniques have sought to replace the analog lines over which information is typically transmitted with specialized transmission media such as ISDN (Integrated Services Digital Network) lines. A typical ISDN line has an uncompressed speed of 128K baud. However, ISDN lines are frequently more expensive than analog lines and are not available in every area.

Consequently, it would be desirable to provide a mechanism for downloading multiple related files from a server to a client, by dynamically combining the files on the server, and passing them in a single download event.

SUMMARY OF THE INVENTION

This invention relates to a method and apparatus for downloading a selected file from the Internet, where the selected file has either companion files, optional files, documentation or other similarly related files. In order to download the selected file along with the appropriate similarly related files, a user has to initiate several separate download sessions. In each of these sessions, the user must specify which objects/files must be obtained and where the files are to be stored on a client machine. This invention combines the selected file plus any related files dynamically on a server and passes the combined files in a consolidated binary datastream as a single download event to a user's client machine. The binary datastream contains a header which is later decoded via client-side executable. The client-side executable interprets the header of the download files and allows extraction of single file, any subset of the downloaded files or all of the files. Additional descriptors may be embedded into the datastream which allow the client-side executable to display other information relative to the collection of downloaded files.

DETAILED DESCRIPTION OF THE EMBODIMENTS

This invention provides a method and apparatus for downloading a file to a client machine which has multiple associated files. The associated files may consist of companion files, optional files, documentation or other related files and are separately stored on a server machine. The invention eliminates the need for a user to initiate several separate download sessions in order to download the appropriate files from the server machine. This invention provides the capability for combining files dynamically on the server and passing them in a consolidated stream to the client machine.

Figure 1:
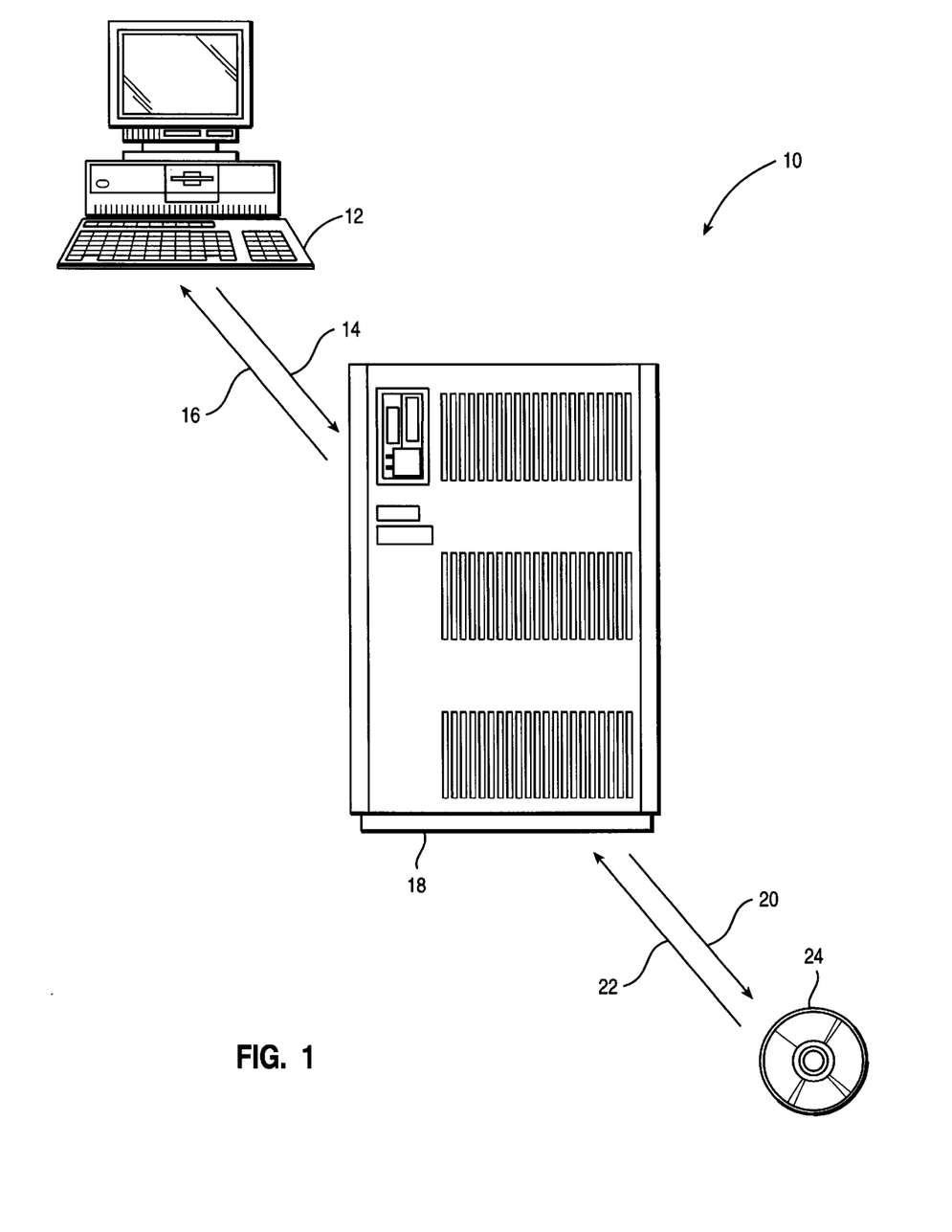
FIG. 1 is a representation of a client/server environment where this invention may be practiced.

Referring now to FIG. 1, there is shown a client/server system 10 capable of downloading multiple separate files on a server 18 to a client machine 12. A user (not shown) at client machine 12 sends requests 14 via an HTML (Hyper Text Markup Language) page to the server machine 18. The server 18 processes the request 14 and initiates an Input/Output procedure 20 to obtain the requested files on file storage device 24. The server 18 receives the requested information 22 from file storage device 24 and assembles header information and binary file content for transmission to the requester. The server 18 streams data dynamically 16 to the client 12 without creating a physical file on the server machine 18. The above processing is implemented in both server code and code implemented as a client-side executable (exe). The server side processing consists of the server code which is sensitive to the arguments passed from the client side. Specifically, the server code is sensitive to the following arguments: (1) One to many filenames which are to be combined, and (2) descriptor arguments. By sending the server side code these arguments, the code is able to open files which are resident on the server, read these files, and combine them along with a descriptive header and offset information into a binary data stream which is then passed on to the client machine.

Figure 2:
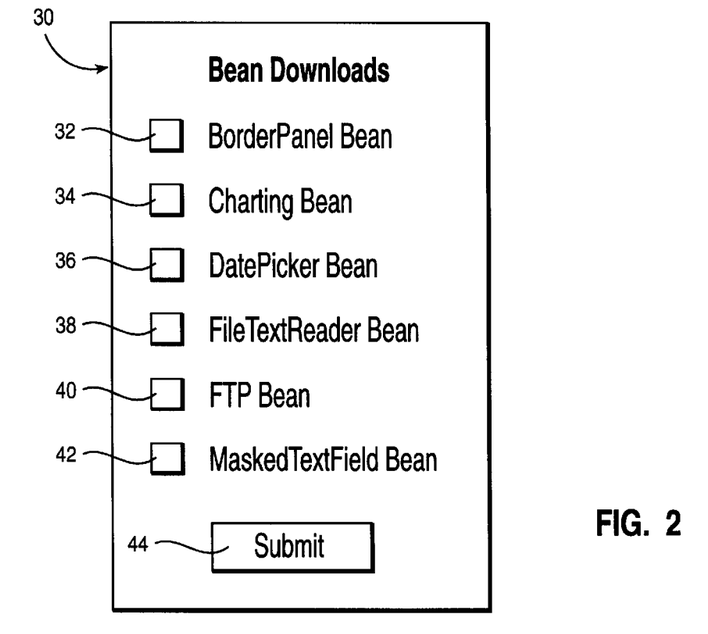
FIG. 2 is a display screen on a client machine showing the objects/files for downloading to the client machine.

Referring now to FIG. 2, there is shown a display screen 30 where a user selects the files resident on the server machine which will be downloaded to the client. In the preferred embodiment, the names of the files on the server are presented to the user along with check boxes 32–42 to allow selection by a user. A submit button 44 is also provided to allow the user to indicate completion of the file selection process. One skilled in the art will appreciate that similar methods may be employed for file selection such as changes in the color of the file name or highlighting that will fit within the realm of this invention.

Figure 3:
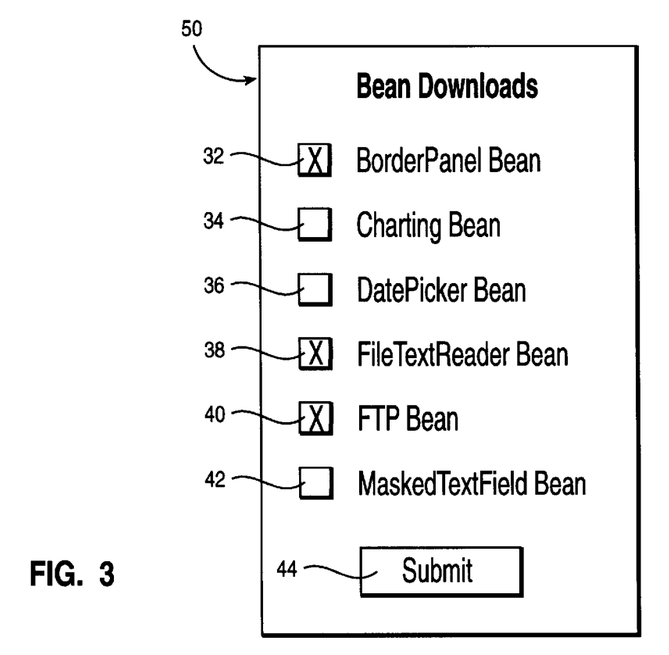
FIG. 3 is a display screen on a client machine with a user's selections for downloading from a server to a client machine.

Turning now to FIG. 3, there is shown a display screen 50 showing files selected by a user. The user has selected a subset of the available files which have be marked with an "x" to show their selection. The user has selected the BorderPanel Bean 32, FileTextReader Bean 38, and the FTP Bean 40 files for downloading to the client machine. Once selection is complete, the user presses the Submit button 44 to initiate the download process.

Figure 4:
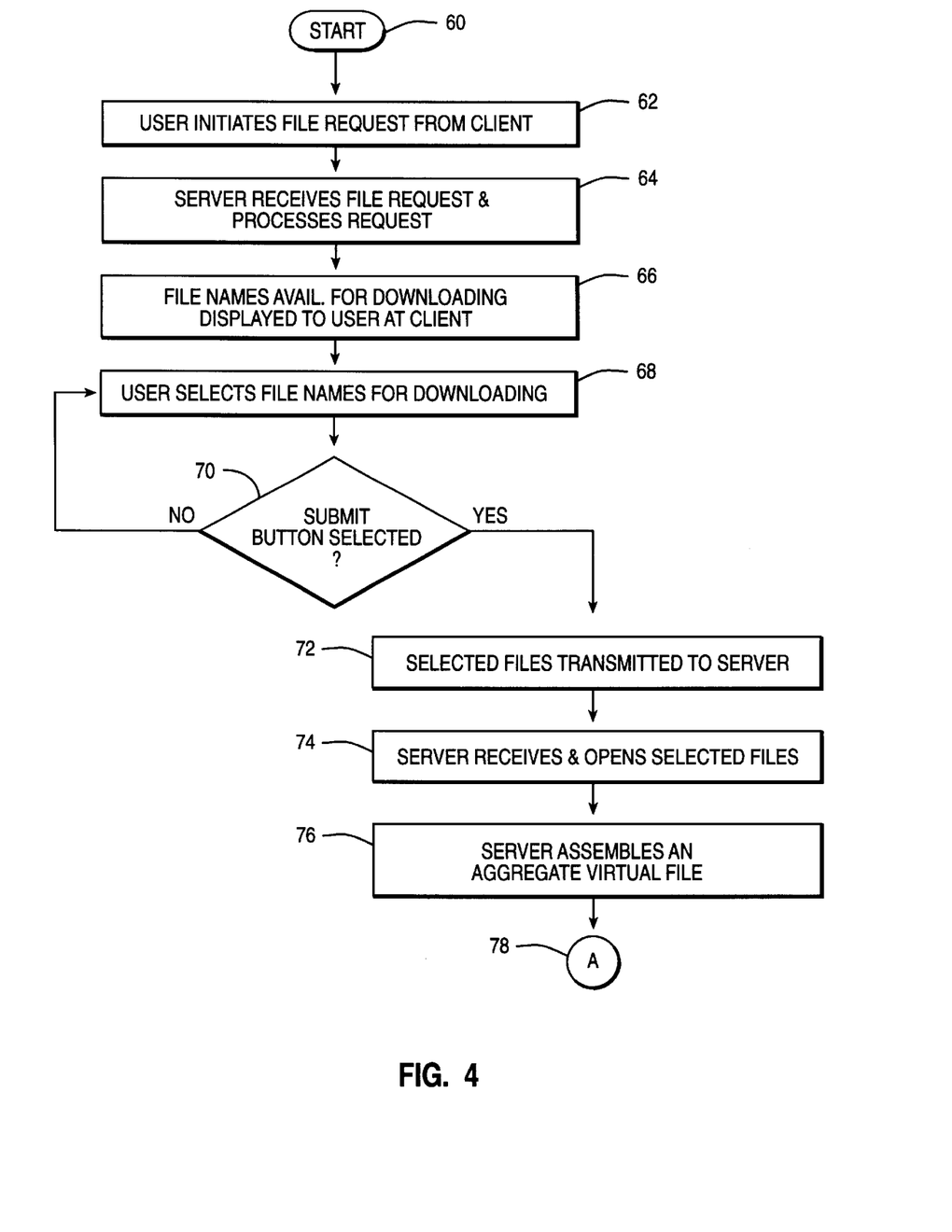
FIGS. 4–6 are flow diagrams for downloading multiple separate files using the invention.
Figure 5:
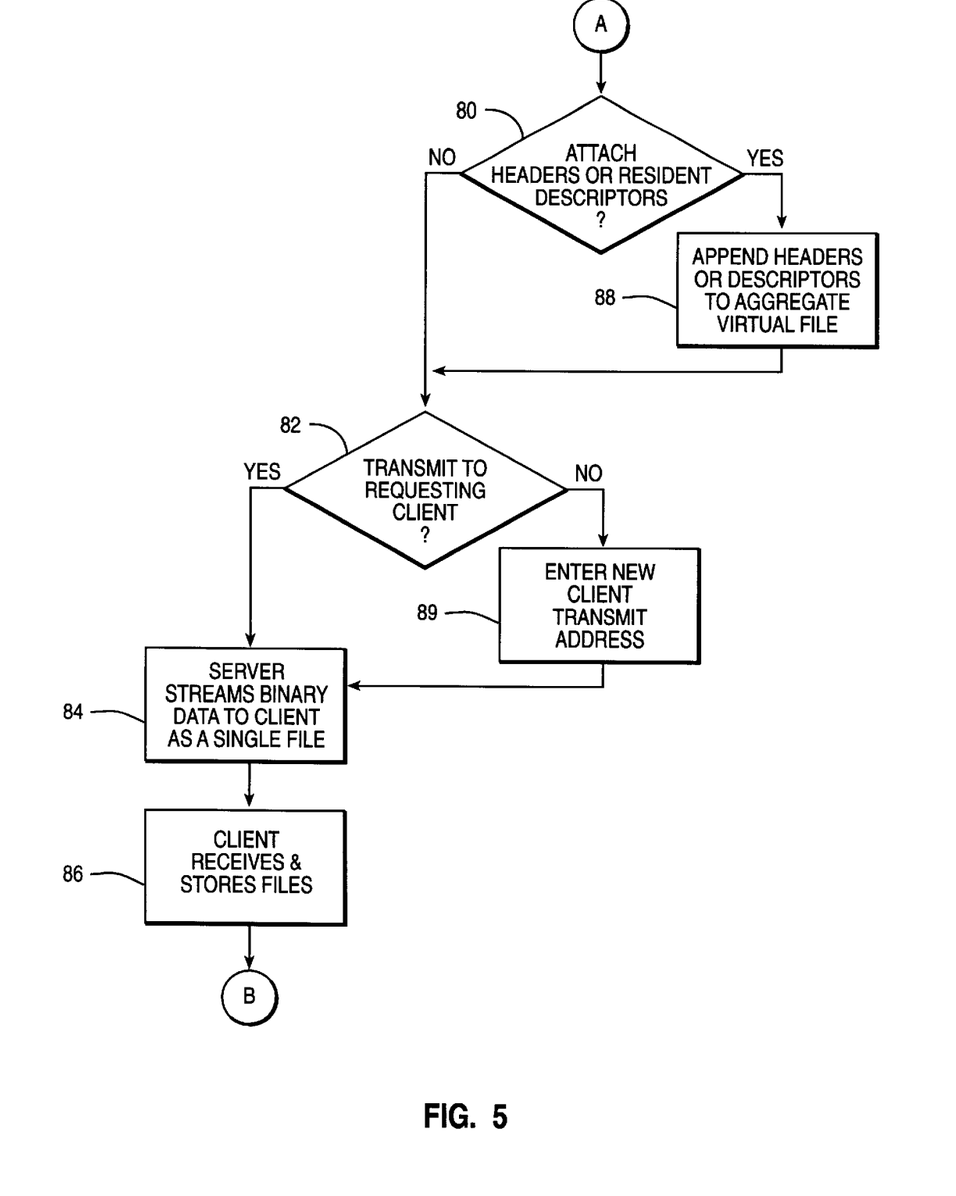
Figure 6:
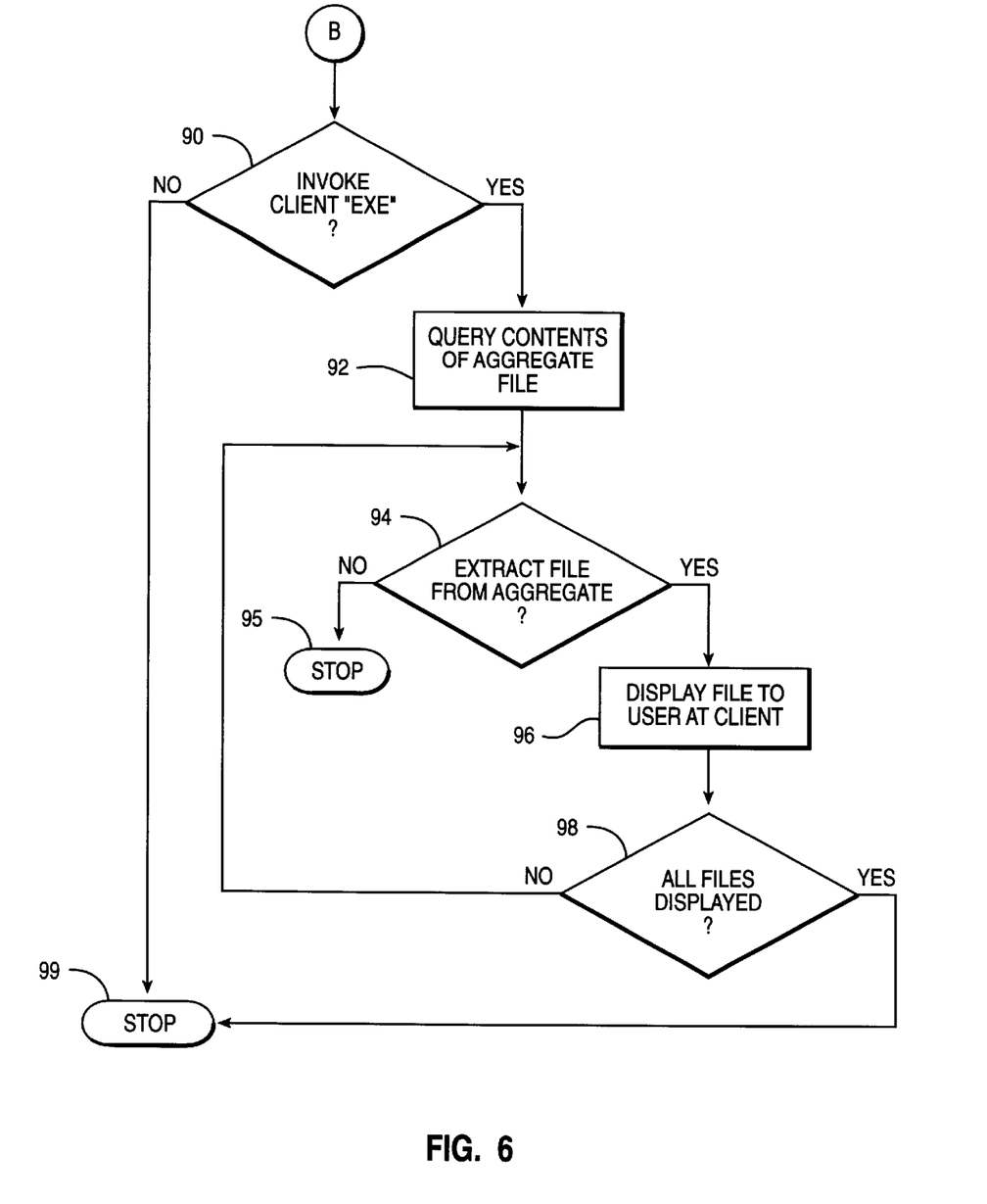

Referring now to FIGS. 4–6, there is shown flow diagrams for downloading files from a server to a client. The procedure starts at block 60 and proceeds to block 62 where a user initiates a file request from the client machine to a server machine. At block 64, the server receives the file request and processes the request from the client machine. At block 66, the file names for the files resident on the server, available for downloading to the client machine are displayed to the user at the client machine. The user selects the file names for downloading at block 68 and the procedure checks at block 70 to determine if the "SUBMIT" button as been selected. If NO, the procedure returns to block 68 to allow the user to select additional files for downloading. If the "SUBMIT" button has been selected at block 70, processing proceeds to block 72 where the selected filenames are routed to the server. At block 74, the server receives the selected files and opens the files. At block 76, a Servlet (e.g., Server side logic) opens the selected files and assembles an aggregate virtual file. Processing then proceeds to FIG. 5, block 80, where the procedure determines if headers or resident descriptors are to be attached to the aggregate virtual file. The client-side executable interprets the headers so that one, a few, or all of the embedded files may be extracted. In a similar manner, server resident descriptors may be appended to the aggregate virtual file to allow the client-side executable to display information relative to the collection of embedded files such as file size, creation date, purchase price, etc. Returning to block 80, If YES, processing proceeds to block 88 where the headers or descriptors are appended. At block 82, the procedure determines if the aggregate virtual file should be sent to the user who submitted the original request. If NO, a new client transmission address may be entered at block 89. If the virtual file is to be sent to the original requester, at block 84 the server streams the binary data back to the client as a single file. One skilled in the art will appreciate that the aggregate file does not reside on the server but is created on-the-fly and is streamed to the client dynamically. Returning to block 86, the client receives and stores the files sent by the server. Processing then proceeds to block 90, FIG. 6, where the procedure determines if the user has invoked the client-side executable (exe). If NO, the procedure Stops at block 99. If the client side executable has been invoked, the exe queries the contents of the aggregate virtual file as shown in block 92. At block 94, the procedure determines if a particular file should be extracted from the aggregate virtual file. If NO, the procedure ends at block 95. If YES, the procedure displays the extracted file to the user at the client machine as shown in block 96. At block 98, the procedure determines if all the files have been displayed. If NO, processing returns to block 94 where additional files may be extracted from the aggregate virtual file. If all the files have been displayed at block 98, the procedure stops at block 99.

Figure 7:
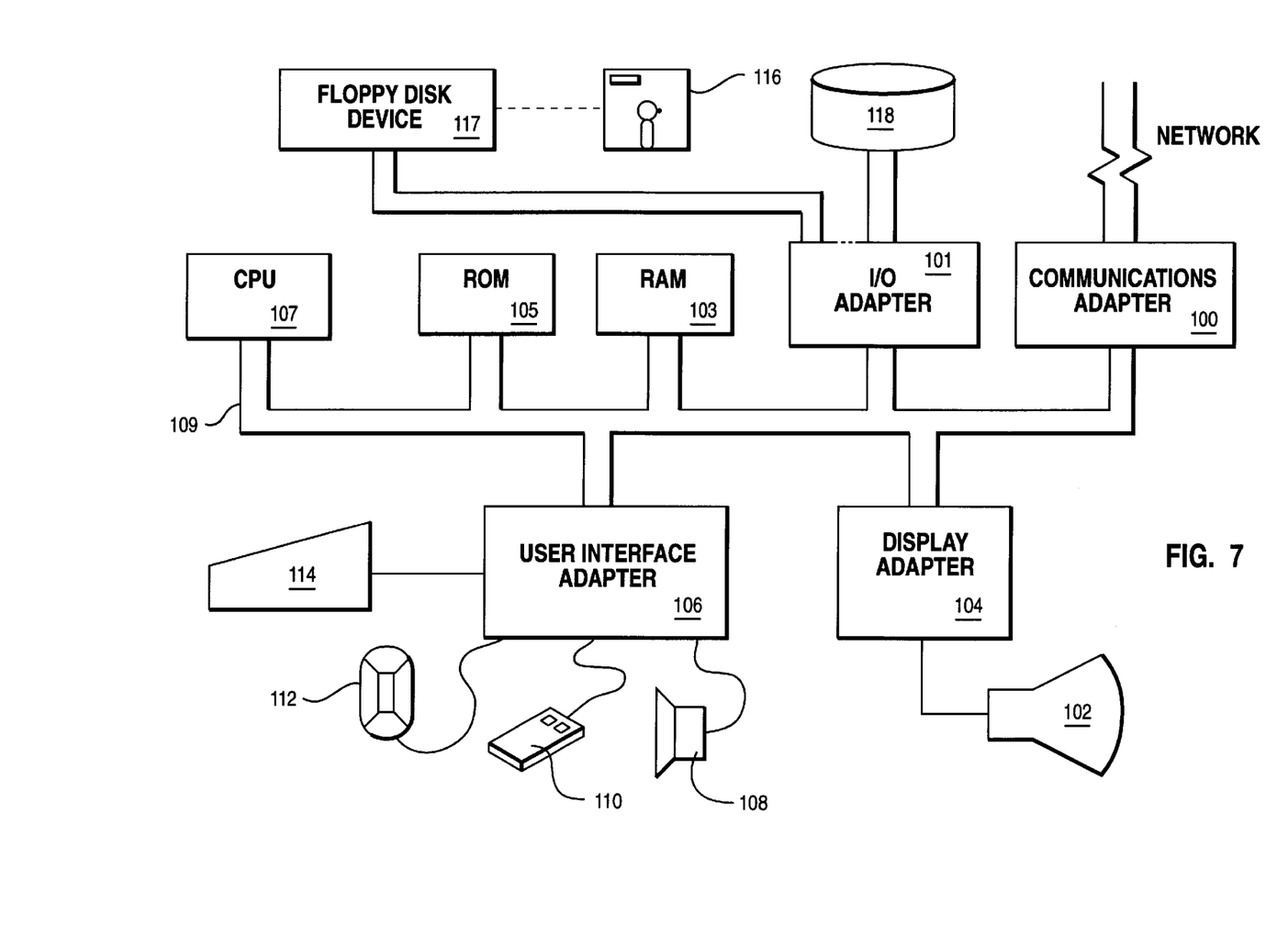
FIG. 7 is an illustrative embodiment of a computer workstation where the present invention may be practiced.

Referring now to FIG. 7, there is shown a pictorial representation of a workstation which may be used as a client or server machine, having a central processing unit 107, such as a conventional microprocessor, and a number of other units interconnected via a system bus 109. The workstation shown in FIG. 7, includes a Random Access Memory (RAM) 103, Read Only Memory (ROM) 105, an I/O adapter 101 for connecting peripheral devices such as floppy disk unit 117 to the bus, a user interface adapter 106 for connecting a keyboard 114, a mouse 110, a speaker 108, a microphone 112, and/or other user interface devices such as a touch screen device (not shown) to the bus, a communication adapter 100, for connecting the workstation to a data processing network and a display adapter 104, for connecting the bus to a display device 102. The workstation, in the preferred embodiment, has resident thereon server or client software making up this invention which may be loaded from diskette 116.

Figure 8:
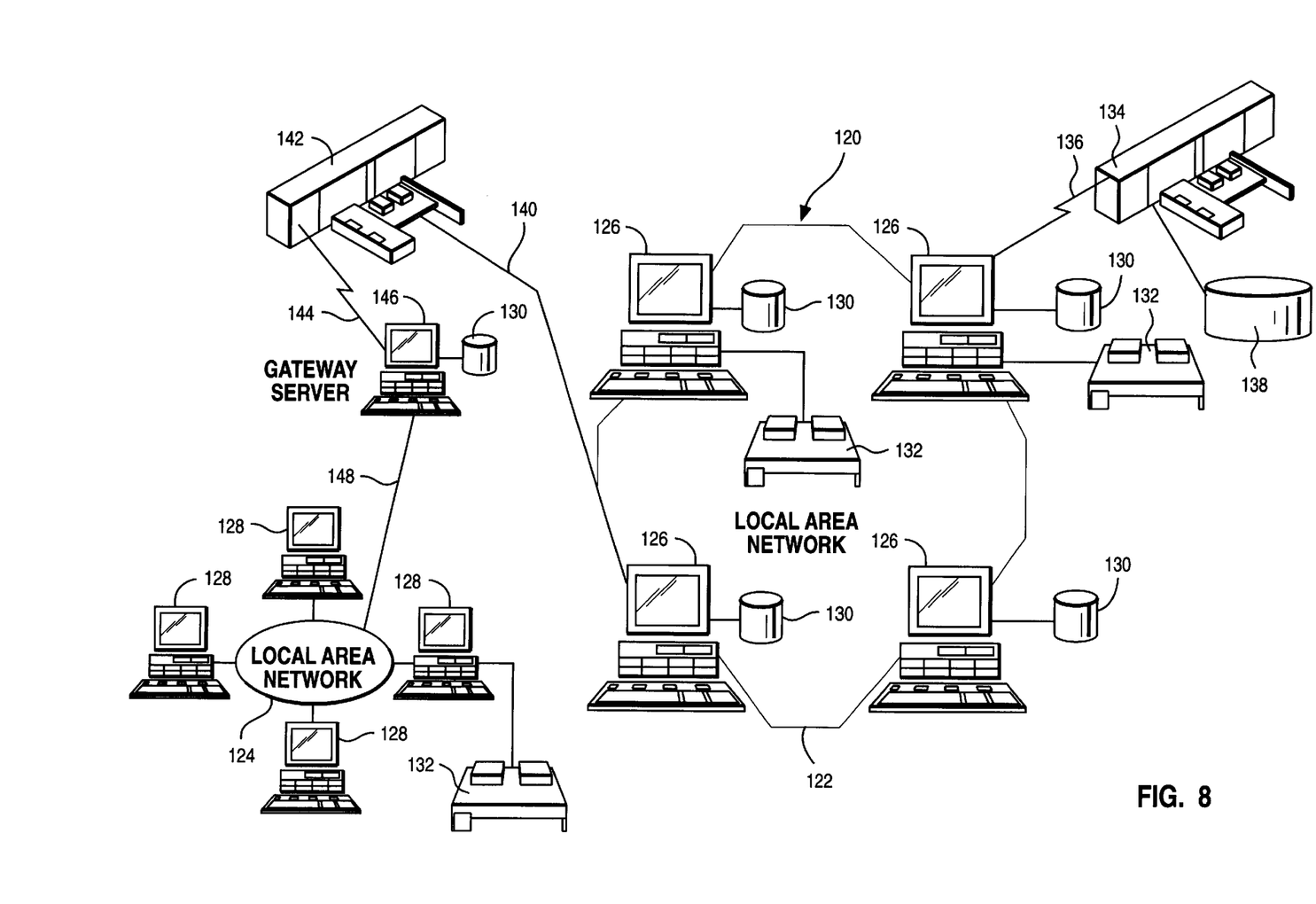
FIG. 8 is an illustrative embodiment of a heterogeneous distributed data processing system in accordance with the present invention.

A representative network environment where this invention may be practiced is depicted in FIG. 8, which illustrates a pictorial representation of a distributed data processing system 120. As illustrated, data processing system 120 contains a plurality of networks, including local area networks (LAN) 122 and 124, each of which preferably includes a plurality of individual computers 126 and 128, respectively as shown in FIG. 7. One skilled in the art will appreciate that a plurality of workstations coupled to a host processor may be utilized for each such network. As is common in such data processing systems, each computer 126 and 128, may be coupled to a storage device 130, and a printer 132.

Data processing system 120 further includes one or more mainframe computers, such as mainframe computer 134, which may be preferably coupled to LAN 122 by means of a communication link 136. Mainframe computer 134 is preferably coupled to a storage device 138, which serves as remote storage for LAN 122. LAN 122 is also coupled via communications link 140 through communications controller 142 and communications link 144 to gateway server 146. Gateway server 146 is preferably a workstation which serves to link LAN 124 to LAN 122 via communications link 148. As understood by one skilled in the art, data processing system 120 additionally includes illustrated gateways, routes, bridges, and various other network hardware utilized to interconnect the segments of data processing system 120.

While the invention has been described with respect to a preferred embodiment thereof, it will be understood by those skilled in the art that various changes in detail may be made therein without departing from the spirit, scope, and teaching of the invention. The invention eliminates the need to create static aggregate files on the server because they are created dynamically on the server. The need to write HTML pages specific to each file download is eliminated by the single file download of the invention. Related files are displayed and grouped together thus allowing the user to select from a list. In this way, there is no need to utilize additional server DASD for specific combinations of files and the user's server experience is consolidated into one server event rather than multiple downloads. Accordingly, the herein disclosed invention is to be limited only as specified in the following claims.

What we claim is:

1. A method, implemented in a computer system, for downloading a file having a plurality of associated files from a server machine to a client machine, comprising the steps of:

identifying and displaying said file and said plurality of associated files resident on said server for downloading to a user at said client machine;

selecting said file and at least one of said plurality of associated files by said user at said client machine for downloading to said client machine;

assembling an aggregate virtual file on said server from said selected file and said associated file; and downloading said aggregate virtual file as one single file from said server machine to said client machine.

2. The method of claim 1 wherein the step of assembling a file having a plurality of associated files from a server machine to a client machine further comprises:

appending headers and descriptors to said aggregate virtual file for extracting said selected files at said client machine.

3. The method of claim 1 wherein the step of downloading said aggregate virtual file further comprises:

streaming said aggregate virtual file to said client from said server; and receiving said aggregate virtual file at said client machine for storage thereon as stipulated by said user.

4. The method of claim 3, wherein the step of downloading said aggregate virtual file further comprises:

invoking a client side executable against said aggregate virtual file on said client machine for extracting at least one of said selected files as indicated by said user.

5. An apparatus for downloading a file having a plurality of associated files from a server machine to a client machine, comprising:

means for identifying and displaying said file and said plurality of associated files resident on said server for downloading to a user at said client machine;

means for selecting said file and at least one of said plurality of associated files by said user at said client machine for downloading to said client machine;

means for assembling an aggregate virtual file on said server from said selected file and said associated file; and means for downloading said aggregate virtual file as one single file from said server machine to said client machine.

6. The apparatus of claim 5 wherein said means for assembling a file having a plurality of associated files from a server machine to a client machine further comprises:

means for appending headers and descriptors to said aggregate virtual file for extracting said selected files at said client machine.

7. The apparatus of claim 5, wherein the means for downloading said aggregate virtual file further comprises:

means for streaming said aggregate virtual file to said client from said server; and means for receiving said aggregate virtual file at said client machine for storage thereon as stipulated by said user.

8. The apparatus of claim 7 wherein the means for downloading said aggregate virtual file further comprises:

means for invoking a client side executable against said aggregate virtual file on said client machine for extracting at least one of said selected files as indicated by said user.

9. A computer program product having a computer useable medium having computer program logic recorded thereon for downloading a file having a plurality of associated files from a server machine to a client machine, comprising:

computer useable means for identifying and displaying said file and said plurality of associated files resident on said server for downloading to a user at said client machine;

computer useable means for selecting said file and at least one of said plurality of associated files by said user at said client machine for downloading to said client machine;

computer useable means for assembling an aggregate virtual file on said server from said selected file and said associated file; and computer useable means for downloading said aggregate virtual file as one single file from said server machine to said client machine.

10. A computer program product of claim 9 wherein said computer useable means for assembling a file having a plurality of associated files from a server machine to a client machine further comprises:

computer useable means for appending headers and descriptors to said aggregate virtual file for extracting said selected files at said client machine.

11. A computer program product of claim 10, wherein said computer useable means for downloading said aggregate virtual file further comprises:

computer useable means for streaming said aggregate virtual file to said client from said server; and computer useable means for receiving said aggregate virtual file at said client machine for storage thereon as stipulated by said user.

12. A computer program product of claim 11 wherein said computer useable means for downloading said aggregate virtual file further comprises:

computer useable means for invoking a client side executable against said aggregate virtual file on said client machine for extracting at least one of said selected files as indicated by said user.

* * * * *